(12) United States Patent
Arocena De La Rua et al.

(10) Patent No.: US 8,388,316 B2
(45) Date of Patent: Mar. 5, 2013

(54) BLADE INSERT

(75) Inventors: Ion Arocena De La Rua, Sarriguren (ES); Eneko Sanz Pascual, Sarriguren (ES); Sandra Arroz Collado, Sarriguren (ES)

(73) Assignee: Bamesa Innovation & Technology S.L., Sarriguren (ES)

( * ) Notice: Subject to any disclaimer, the term of this patent is extended or adjusted under 35 U.S.C. 154(b) by 922 days.

(21) Appl. No.: 12/492,163

(22) Filed: Jun. 26, 2009

(65) Prior Publication Data

US 2009/0324420 A1    Dec. 31, 2009

(30) Foreign Application Priority Data

Jun. 27, 2008 (ES) .................. 200801927
Nov. 18, 2008 (ES) .................. 200803279

(51) Int. Cl.
*F03D 11/02* (2006.01)
(52) U.S. Cl. ............. 416/224; 416/229 R; 29/527.2; 29/889.7; 29/889.71; 29/889.72
(58) Field of Classification Search ............. 416/223 R, 416/224, 225, 226, 229 R, 230, 232, 233; 156/87; 29/527.1, 889.7, 889.71, 889.72; 403/25, 167, 364

See application file for complete search history.

(56) References Cited

U.S. PATENT DOCUMENTS

| 7,530,168 | B2 * | 5/2009 | Sorensen et al. ........... 29/889.21 |
| 8,123,883 | B2 * | 2/2012 | Llorente Gonzalez et al. . 156/87 |
| 2010/0084079 | A1 * | 4/2010 | Hayden et al. ................ 156/189 |
| 2010/0122442 | A1 * | 5/2010 | Kirkpatrick et al. ........... 29/233 |

FOREIGN PATENT DOCUMENTS

EP            1 878 915 A2    1/2008
WO    WO 2007010064 A2 *    1/2007

* cited by examiner

*Primary Examiner* — Edward Look
*Assistant Examiner* — Jason Davis
(74) *Attorney, Agent, or Firm* — Ladas & Parry LLP

(57) ABSTRACT

Blade insert connected in the lamination of a blade determining a double shear joint between insert and lamination. The insert is made up of two defined parts, head (2), designed to screw the insert to another structure (2'), and the body (3) that determines a cylindrical or conical shape with an internal conical cavity. In an embodiment, the insert is designed to be joined to the lamination (1) of the blade with adhesive means (4). In another embodiment, the insert is embedded in the blade lamination with an inner part (5) stuck to the body (3) of the insert.

12 Claims, 5 Drawing Sheets

BLADE INSERT

OBJECT OF THE INVENTION

The invention describes an insert for a wind turbine blade according to the preamble in the first claim.

BACKGROUND OF THE INVENTION

Wind turbines blades are typically joined to the wind turbine hub with a mechanical multipoint joints, prestressed with stressed screws. Likewise, the blades divided into several modules can be assembled with mechanical joints between metal parts called inserts. The basic function of these blade root joint elements and the intermediate joint elements is transferring traction and/or compression loads transmitted from the blade laminations.

The nearest state-of-the-art corresponds to patent EP 18789155 where metal inserts axially housed in blade module walls are presented, where this wall is made of a composite lamination with a series of holes. The structural joint between the composite material and the inserts is carried out with chemical means (adhesive) and is defined as a single shear joint, as each side of the insert is in contact with one of the sides of the hole in the composite material.

However, the transfer of traction and/or compression loads produced in the blade's laminations as a consequence of the loads caused in the blade by the action of the wind are very big. This problem could be solved reinforcing the module walls with more fibre and large inserts, but this excess weight in the blades would unacceptably increase loads in the wind turbine.

DESCRIPTION OF THE INVENTION

To obtain a suitable loads transfer, a specific insert is defined which is installed in such a way in the blade lamination that it forms a double shear joint.

The insert is made up of two defined parts, the head and the body, and the head is designed for screwing the insert to another structure (for example, the wind turbine hub bearing or another insert corresponding to another blade module), while the body comprises a cylindrical or conical area with a conical inner cavity for chemically joining the insert to the lamination.

The joint between the insert and the lamination has two alternatives:

in the first, the insert is joined to the lamination with chemical means (adhesive), inside a machined cavity in the already cured lamination.

in the second, the insert is embedded in the lamination, together with an inner part, during the laminating process. During the lamination curing process, the composite material resin chemically bonds the lamination to the insert.

On its part, the head of the insert has two alternatives according to the insert we are talking about, an insert for joining intermediate blade parts or a blade root insert;

in the first alternative, the insert determines an metal fitting head with a through hole in the second alternative, the head of the insert is completely laminated and determines an inner threaded area.

BRIEF DESCRIPTION OF THE FIGURES

The following figures are included to explain the insert's joint.

DESCRIPTION OF A PREFERRED EMBODIMENT

The present invention is related to the blades whose main laminations (located in the central areas of the top and bottom of the aerodynamic profile) are manufactured out of solid lamination and it describes a blade insert whose characteristics allow for implementing it on the blade with a double shear joint.

Figure 1:
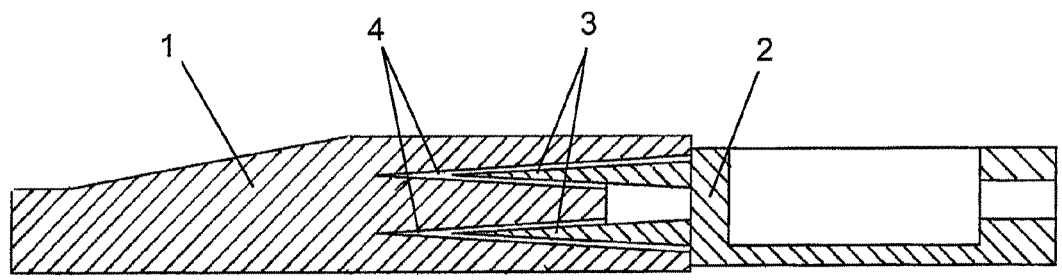
FIG. 1 shows a section of the insert joint and the blade wall lamination according to a first embodiment.

As shown in FIG. 1, the blade insert subject to the present invention, comprises two different parts, head (2) and body (3), with the head (2) designed for screwing, with fixing elements (9), the insert to another structure (1', 2', 3'), and the body (3) designed for fixing to the lamination (1) of the blade with adhesive means (4).

Figure 7:
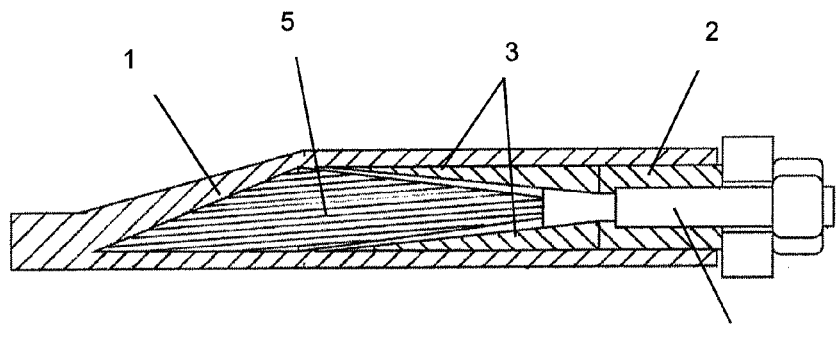
FIGS. 7 and 8 show two embodiments of the insert head, subject to the present invention, according to its area of implementation in the blade.
Figure 8:
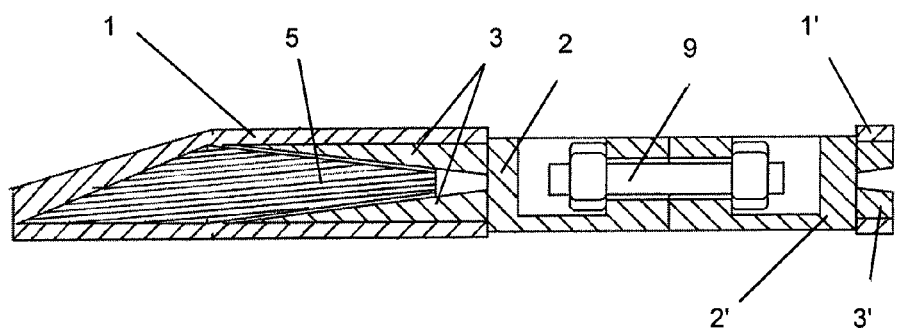

The insert's body (3) determines a cylindrical or conical shape with an inner conical cavity, while the head, as shown in FIGS. 7 and 8, determines a threaded area or an area with an iron head with a through hole according to if it is installed as an insert on the blade root or as a blade intermediate joint insert, respectively.

Figure 2:
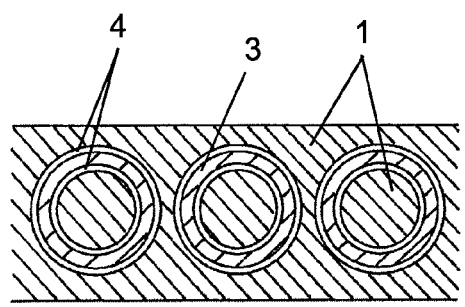
FIG. 2 constitutes a transversal section of the joint between the insert and lamination corresponding to the previous figure.

In this way, in a first embodiment, the joint between the insert body (3) and the blade lamination (1) is carried out by thickening the lamination (1) near to the joint, so that when the lamination has cured, it can be machined with revolution geometry, determining a conical cavity that coincides with the shape of the insert's body (2), and this body (2) inserted with adhesive means (4), see FIGS. 1 and 2.

Figure 3:
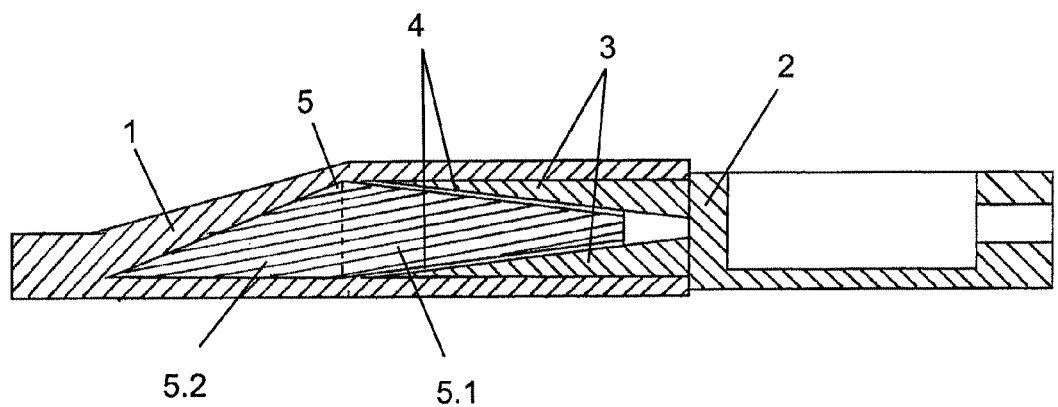
FIG. 3 shows a section of the insert joint and the blade wall lamination according to a second embodiment.
Figure 4:
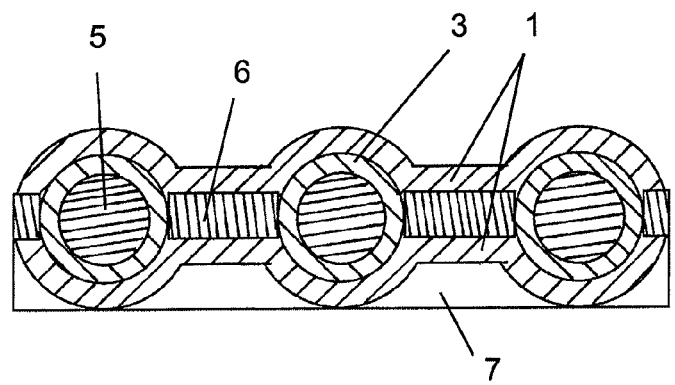
FIG. 4 constitutes a transversal section of the joint between the insert and lamination corresponding to the previous figure.

In another embodiment of the joint, the insert is embedded in the blade lamination, and therefore an inner part (5) stuck to the insert body (3) is inserted, as shown in FIG. 3, that allows for continuously laminating composite material layers from the blade lamination to the top of the insert.

This inner part (5) determines two sections, one conical (5.1), stuck with adhesive (4) to the surface of the insert body's conical inner cavity (3), and another cylindrical cavity (5.2) and chamfered.

These inner parts (5) can be made of different materials according to the resistance of the joints required for each application. In this way, when there are high resistance requirements a rigid material such as fiberglass is used, for example, and when these requirements are low a light and less rigid material is used such as foam or wood.

Figure 5:
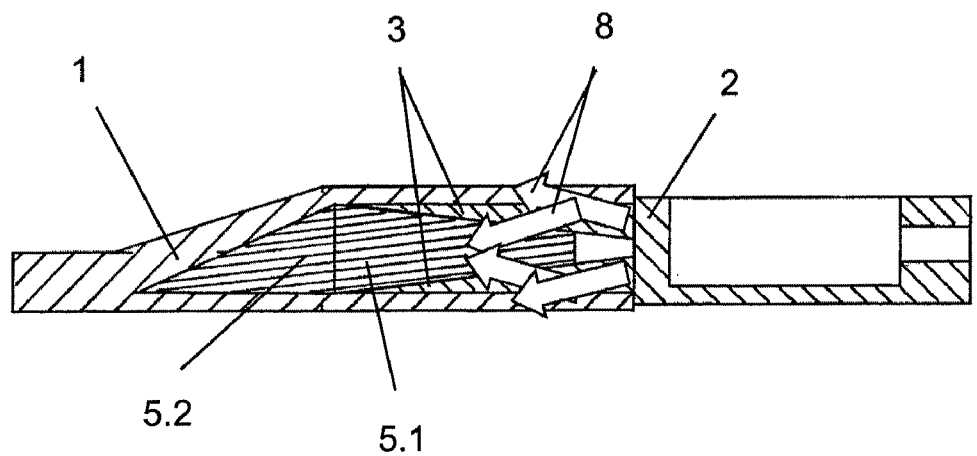
FIGS. 5 and 6 show a section of the joint indicating the transmission of loads according to the rigidity of the material used in the inner part.
Figure 6:
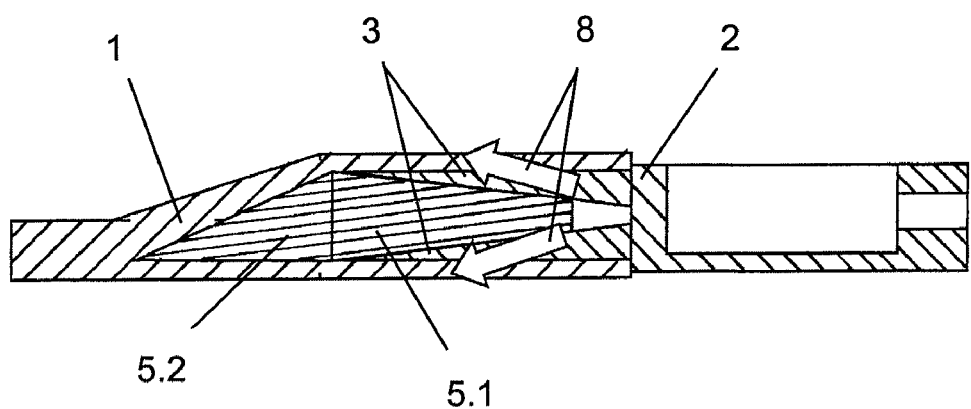

Loads transmission (8) is different in each case, as shown in FIGS. 5 and 6, as when rigid materials are used in the inner part (5), a part of the load is transmitted from the insert directly to the lamination (1) and another part of the load is transmitted from the insert to the inner part (5) to subsequently pass onto the lamination (1) via the inner part's (5) surface, which is outside the insert, making up in this way a double shear joint, while in the case of using lighter and less rigid materials, loads transmission (8) between the insert and the lamination (1) is mainly carried out via the outer side of the insert.

Finally, the introduction of some separators (6) between inserts is foreseen, which may be made out of fiberglass or foam.

The method for positioning the insert next to the inner part (5) is characterized by using a mould (7) with a corrugated surface so that the lamination (1) adapts to the insert's cylindrical shape. A series of layers of composite material are laminated on this surface (fiberglass or carbon fiber) and on them are placed the inserts to which the inner parts (5) have been stuck beforehand. The separators (6) described above are positioned between the inserts, and finally the rest of the composite material layers are laminated on the inserts.

The lamination process may out of preimpregnated material, i.e., the material has been previously impregnated in resin, or dry fabric followed by a resin infusion.

As it has been said before, according to the characteristics of the joint to be made (if it is going to be installed as an insert of the blade root or as an insert to join intermediate parts) the head (2) of this insert varies, as if the insert is going to be joined to a flange (blade root joint), this head (2) determines an inner threaded area and is embedded in the lamination (1) of the blade and if the insert is going to be joined to an identical insert on another structure, it determines a metal fitting head (2) equipped with a through hole that is not embedded in the lamination (1) (see FIGS. 7 and 8 respectively).

Figure 9:
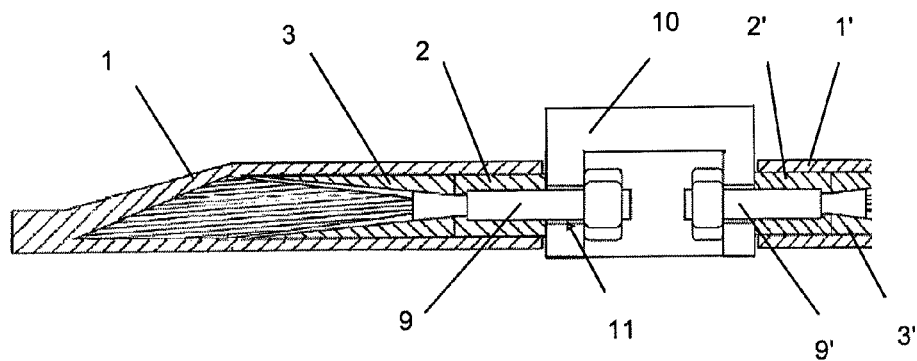
FIG. 9 shows the joint between the two inserts of different structures according to the embodiment in FIG. 7.

As shown in FIG. 9, another alternative to join the insert to an identical insert of another structure (1', 2', 3'), foresees inserting an auxiliary metal fitting (10) that determines at least one non-threaded through hole (11) and that houses the fastening head (12) of the anchor bolts (9, 9') of both inserts of the structures (1, 2, 3; 1', 2', 3').

Figure 10:
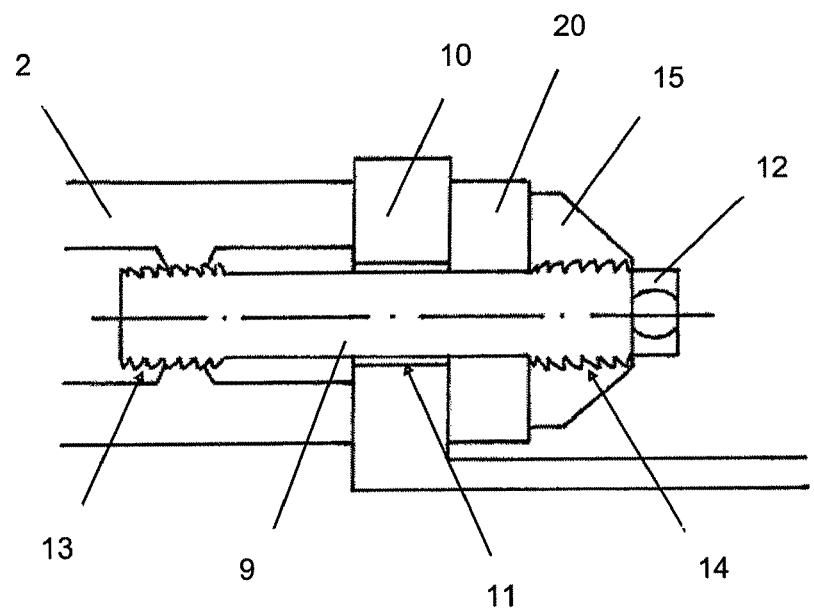
FIG. 10 shows a section of the insert of the joint between the metal fitting, the insert and the bolt according to the embodiment in FIG. 7.

These bolts (9, 9') determine an inner "anti-clockwise" thread (13), an outer "clockwise" thread (14) and a fastening head (12) at the end of the bolt (9, 9'). After the fastening head (12) is a nut (15) that determines on this bolt (9) a "clockwise" thread, as shown in FIG. 10. Between the nut (15) and the auxiliary metal fitting (10) is a washer (20).

The tightening process is based on exerting a torque on the outer surface of the nut (15) that is reacted on the fastening head (12) of the bolt (9). When the torque is applied, if the two threads (13, 14) of the bolt (9) are correctly lubricated, no relative movement will occur between the head (2), the auxiliary metal fitting (10) and the nut (15). As a result of the applied torque, the bolt (9) progresses in one direction along the head's thread (2) and in the opposite direction on the nut's (15) thread, which results in a prestressing of the bolt (9).

Figure 11:
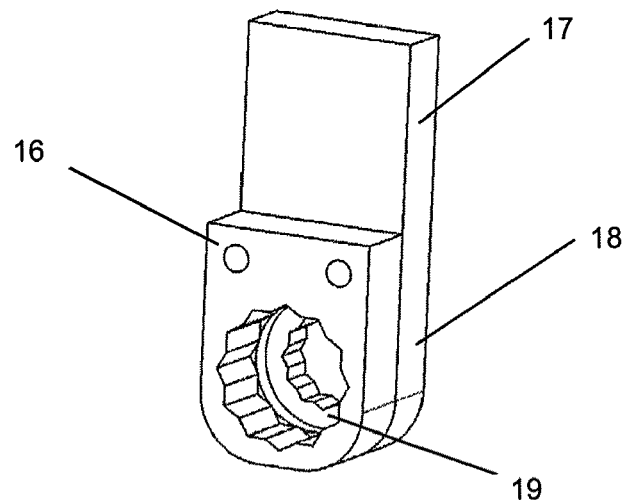
FIG. 11 shows an embodiment of a tightening tool related to the embodiment of FIG. 7.

To make the tightening according to this preferred embodiment, a tool like the one shown in FIG. 11 is used. This tool preferably consists of two different parts: a fixed wrench (16) that supports the nut (15) during tightening and an active wrench (17) consisting of a fixed track (18), that is integrally joined to the fixed wrench (16), and a moving track (ratchet type) (19), that applies the torque to the fastening head (12) of the bolt (9).

The invention claimed is:

1. A blade insert coupled in a solid lamination located in a top or bottom center part of the aerodynamic part of a blade, wherein:

the insert is made of a head (2), comprising a metal fitting head equipped with a through-hole that is not embedded in the lamination (1) designed to screw the insert to an identical insert on another structure (1', 2', 3'), and a body (3) for joining to the lamination (1) that determines a cylindrical or conical shape with an internal conical cavity, and the joint between the insert and lamination (1) is carried out with an adhesive, chemical double sheathed joint (4), on the outer and/or inner surface of the insert's body (3).

2. The blade insert of claim 1, wherein the body of the insert is embedded in the blade's (1) lamination and at least one inner part (5) is stuck to the inner part of the insert's body (3).

3. The blade insert of claim 2, wherein the shape of the inner part (5) determines two sections, one conical (5.1), stuck with adhesive (4) to the surface of the insert body's conical inner cavity (3), and another cylindrical cavity (5.2) and chamfered.

4. The blade insert of claim 2, wherein in the manufacturing of the inner part (5), fiberglass is used due to its rigidity and provides a high resistance joint between the laminate and the insert.

5. The blade insert of claim 2, wherein in the manufacturing of the inner part (5), foam or wood is used due to its lightness and not very rigid material and provides a low resistance joint.

6. The blade insert of claim 1, wherein the insert consists of a body (3) and a head (2) for screwing the insert to another structure (1', 2', 3'), including on said joint an auxiliary metal fitting (10) that determines at least one non-threaded through-hole (11) and at least one anchor bolt (9, 9') per structure to be joined.

7. The blade insert of claim 6, wherein the anchor bolt (9) determines an inner anti-clockwise thread (13), an outer clockwise thread (14), and a fastening head (12) on the end of the bolt (9) around which a nut (15) is screwed.

8. The blade insert of claim 6, wherein the nut (15) to screw onto the bolt (9) of the insert presents a clockwise thread.

9. A method for placing an insert inside a blade lamination, wherein the joint between the insert and the lamination (1), so that the insert is embedded, comprising:

using a mould (7) with a corrugated surface so that the lamination (1) adapts to the insert's cylindrically shaped body (3);

laminating a series of composite material layers on said surface including fiberglass or carbon fiber;

placing the inserts, which the inner parts (5) have been previously stuck to, on the lamination (1);

placing a plurality of separators (6) between the inserts; and laminating additional composite layers on the inserts and separators (6).

10. The method for placing said insert inside said blade lamination according to claim 9, wherein the preimpregnation lamination process is used, the material being previously impregnated with resin.

11. The method for placing the insert inside the blade lamination according to claim 9, wherein the dry fabric lamination process is used, followed by a resin infusion.

12. A blade insert coupled in a solid lamination located in a top or bottom center part of the aerodynamic part of a blade, wherein:

the insert is made of a head (2), designed to screw the insert to another structure (1', 2', 3'), and a body (3) for joining to the lamination (1) that determines a cylindrical or conical shape with an internal conical cavity, and the joint between the insert and lamination (1) is carried out with an adhesive, chemical double sheathed joint (4), on the outer and/or inner surface of the insert's body (3), and wherein the insert is totally embedded in the lamination (1) consisting of a body (3) and a head (2) for screwing the insert to another structure (1', 2', 3'), including on said joint an auxiliary metal fitting (10) that determines at least one non-threaded through-hole (11) and at least one anchor bolt (9, 9') per structure to be joined.

* * * * *

UNITED STATES PATENT AND TRADEMARK OFFICE
CERTIFICATE OF CORRECTION

PATENT NO. : 8,388,316 B2
APPLICATION NO. : 12/492163
DATED : March 5, 2013
INVENTOR(S) : Ion Arocena De La Rua et al.

It is certified that error appears in the above-identified patent and that said Letters Patent is hereby corrected as shown below:

Title Page, Item (73), Assignee: "Bamesa" should read --Gamesa--.

Signed and Sealed this
Seventh Day of May, 2013

Teresa Stanek Rea
*Acting Director of the United States Patent and Trademark Office*